July 2, 1963  H. BURKHARDT  3,096,441
ELECTRO-OPTICAL AND ELECTROMAGNETIC DETERMINATION
OF THE POSITION OF SCALE DIVISIONS
Filed Oct. 12, 1961

Prior art

INVENTOR:
Horst Burkhardt
By: George B. Spencer
Attorney

INVENTOR:
Horst Burkhardt
By: George H Spencer
Attorney

July 2, 1963  H. BURKHARDT  3,096,441
ELECTRO-OPTICAL AND ELECTROMAGNETIC DETERMINATION
OF THE POSITION OF SCALE DIVISIONS
Filed Oct. 12, 1961  7 Sheets-Sheet 7

FIG. 11

INVENTOR:
Horst Burkhardt
By: George H. Spencer
Attorney

United States Patent Office 3,096,441
Patented July 2, 1963

3,096,441
ELECTRO-OPTICAL AND ELECTROMAGNETIC DETERMINATION OF THE POSITION OF SCALE DIVISIONS
Horst Burkhardt, Stein an der Traun, Germany, assignor to Wenczler & Heidenhain, Traunreut, near Traunstein, Upper Bavaria, Germany
Filed Oct. 12, 1961, Ser. No. 144,778
Claims priority, application Germany Oct. 14, 1960
18 Claims. (Cl. 250—209)

The present invention relates generally to devices for determining the position of structural elements provided with a scale, and more particularly to an electric device of this type, preferably one for the electro-optical or electromagnetic determination of the position of scale divisions.

It is already known in this art to scan scales of machine tools with photoelectric cells and to feed the output signals from these cells to a counting register which indicates the corresponding position of the photoelectric cell with respect to this scale. However, such numerically operating devices switch one unit per scale division of the scale and, therefore, are not suitable for indicating analog intermediate or continuous values, so that the position can only be determined from one set check point to another with no continuous checking therebetween being provided.

Also known in this art is a device which supplies analog intermediate values of position. This device is provided with two grids, which are crossed at an extreme acute angle, and which result in a "moiré" of light and dark lines extending approximately at right angles to the scale divisions. If the two grids are displaced with respect to each other in the direction of the scale, i.e., at right angles to the scale divisions, the moiré moves at right angles to the direction of displacement. This moiré is scanned by at least four photoelectric cells which are successively scanned or interrogated by an electrical device in a sequence corresponding to the arrangement thereof. The signals so obtained during the scanning are additively combined. Then, the desired analog intermediate values are obtained from the phase relationship of the combined signal, thereby yielding continuous intermediate values between the individual scale divisions.

This known device requires the use of two scales and this process is not suitable or useable when it is desired to scan individual scale divisions. The reason for this is that a substantial number of scale divisions of both scales must be used in order to generate the moiré arrangement.

Figures 1, 2:
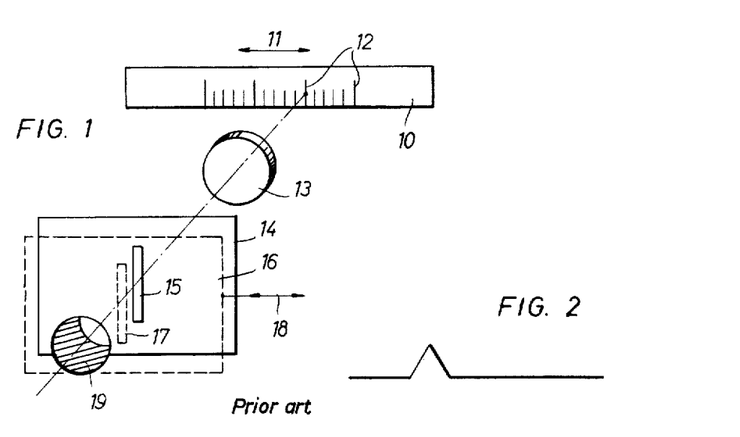
FIGURE 1 is a diagrammatic view of a position indicating device which is part of the prior art technology.
FIGURE 2 is a curve which plots the current of the photoelectric cell against time, in the device of FIGURE 1.

In one of the devices of the prior art, an electro-optical determination of the position is rendered, and this device is illustrated in FIGURE 1 of the drawing. In FIGURE 2 a curve is illustrated which is the photoelectric cell output when this device is used. A scaled disc 10, constructed of glass or the like is provided. Upon this disc a number of scale divisions are arranged. The scale divisions may be applied to the scale disc by vaporizing thereon a metal which has good light reflecting qualities, for example, silver. This scale is to be illuminated by a source of light (not shown) so that the light will be reflected from the scale divisions which may be considered as luminous dashes. The scaled disc 10 may move back and forth in the direction indicated by arrow 11, and it moves with respect to the other elements illustrated in the drawing.

The problem is to determine in an extremely accurate manner and by electrical means the position of scale division 12, for example, at any given instant. A lens 13 having an appropriate amount of magnification focuses a real image of scale division 12 in a plane which, in the drawing, is diagrammatically represented by the boundary 14, so that a magnified real image 15 of scale division 12 is formed in this plane. Therefore, when the scaled disc 10 moves in the direction of the arrow 11, image 15 moves in a horizontal direction along the plane 14.

A mechanical diaphragm 16 provided with a slit 17, is arranged to be coincident with plane 14. For purposes of simplifying the present description, it is assumed that slit 17 is of identical dimensions as image 15. Diaphragm 16 and its slit 17 are oscillated in the direction of arrow 18 so that: (1) a photoelectric cell 19 will always begin to receive light when the slit 17 and the image 15 begin to overlap; (2) the photoelectric cell receives a maximum amount of light when the slit 17 and image 15 are totally overlapping; and (3) the illumination of the photoelectric cell 19 decreases when slit 17 moves from the position of maximum overlap.

Thus, the relationship is as shown in FIGURE 2 where with a constant amplitude of oscillation, the current of the photoelectric cell is plotted against time. The current of the photoelectric cell is zero when the image 15 does not overlap slit 17 at all. The photoelectric cell current increases from the moment when slit 17 begins to overlap image 15, up to a maximum wherein there is total overlap between slit 17 and image 15. Then, when slit 17 moves away from the overlapped position with respect to image 15, the photoelectric cell current decreases and again becomes zero when slit 17 is completely separated from image 15 and there is no overlap whatsoever.

Since the position of image 15 in plane 14 varies, as does the scale division 12 which moves as indicated by arrow 11 and whose position is to be determined, the phase position of the generally triangular photoelectric cell pulse (see FIGURE 2) with respect to a reference curve obtained from the drive or the motion of diaphragm 16 is thus functionally dependent upon the position of the scale division 12 or the image 15 in the drawing plane 14 at any given instant. Thus, if the phase position of the photoelectric cell pulse with respect to the above-mentioned reference curve is measured, an indication of the position of scale division 12 which is to be determined will be obtained. However, since mechanical means are used there are some limitations when using this apparatus including a limitation as to the accuracy which may be achieved.

With these defects of the prior art in mind, it is a main object of the present invention to provide a position indicating device which yields analog intermediate values for the accurate determination of positions of structural elements.

Another object of this invention is to provide a device of the type described, wherein only a single scale division is required.

Another object of this invention is to reduce the manufacturing costs involved in producing such a device and to free the device from limitations regarding the scale which may comprise scale divisions spaced far apart, or, in the limited case, even a single scale division.

Still another object of this invention is to provide a purely electric device, free of mechanical means, which will indicate the position of a scale division and yield a corresponding electric indication thereof.

Yet, another object of the invention is to provide a device which is free of mechanical means and wherein a far greater accuracy may be achieved than is possible with mechanical devices.

These objects and other ancillary thereto are accomplished according to preferred embodiments of the invention, wherein either electro-optical or electro-magnetic devices may be used. For the electro-optical determination of the position of scale divisions, a particular curve shape is obtained by periodically scanning an optical image of a scale division, and the position of this scale division is determined by a curve phase comparison, with a reference time instant.

At least three photoelectric cells are provided, and at least two images of this scale division are formed. Furthermore, the photoelectric cells are so arranged that, without changing the position of the original scale division, the optical image thereof at any given instant is provided on two photoelectric cells adjacent to one another in ordinal or numerical sequence and is staggered or overlaps two of the cells. Also, at least three photoelectric cells are simultaneously illuminated in the central position of the scale division. In order to determine the position of the scale division, the output currents of the photoelectric cells are successively interrogated electrically and without mechanical means, in ordinal sequence and also, if necessary, in the inverse of ordinal sequence. The output currents of the photoelectric cells resulting from this interrogation are additively mixed, and the curve shape resulting therefrom is smoothed and further processed. At this point it may be sent to a device which may render visual indication of the position of the scale division.

Additional objects and advantages of the present invention will become apparent upon consideration of the following description when taken in conjunction with the accompanying drawings in which.

Figure 3:
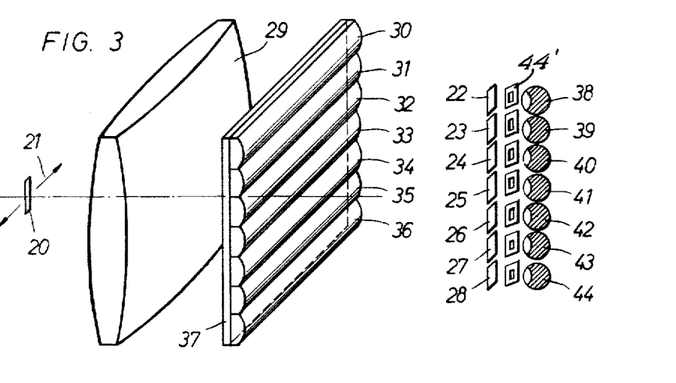
FIGURE 3 is a diagrammatic view of the optical arrangement comprising one embodiment of the present invention.

With more particular reference to the drawings, FIGURE 3 illustrates an optical assembly wherein a luminous scale division 20 is provided and is movable in the direction of arrow 21. Its position at any given instant is to be determined. A lens arrangement of seven equally light and equally large magnified images 22 to 28 is formed from this scale division 20 which is illustrated in its central position. The lens assembly includes parallel and horizontally extending lens elements 30 to 36. The images are all formed in a plane which is at right angles to the optical axis of the device in this figure. Lens 29 as well as the lens elements 30 to 36 are used to form the images.

Figure 3A:
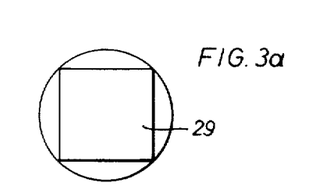
FIGURES 3a and 3b are diagrammatic views which show how the lenses are produced.
Figure 3B:
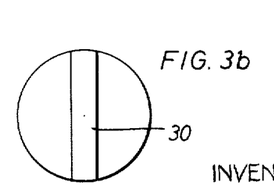

Lens 29 is formed by cutting a rectangular lens from a lens which is originally round, in the manner indicated in FIGURE 3a. Each individual lens element of the lens assembly 30 to 36 is also cut from an originally round assembly, as indicated in FIGURE 3b. Each of these lens elements is cemented to a plane parallel glass plate 37. Lens 29 converts the light reflected from the scale division 20 into parallel light rays, and each of the individual lens elements 30 to 36 forms one of the images 22 to 28.

Seven photoelectric cells 38 to 44 are provided with each having a stationary slit diaphragm 44' coordinated with a cell for limiting the area of the photo-cathode surface. The photoelectric cells 38 to 44 are all disposed in a plane at right angles to the optical axis. However, they are not vertically aligned as are the images 22 to 28 but, are staggered in this plane as will now be described with reference to FIGURE 4a.

Figure 4A:
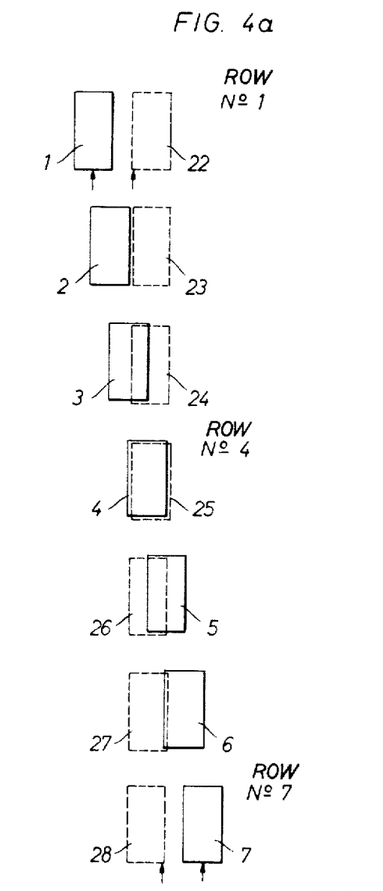
FIGURES 4a and 4b are graphic views of the positions of the scale division with respect to the photoelectric cell and the additive curve which is generated by an interrogation thereof, respectively, with these figures being coordinated under the assumption that the image is moving from the double arrow position illustrated in row 1 to the double arrow position illustrated in the last row.

The plane of the drawing of FIGURE 4a is perpendicular to the optical axis of FIGURE 3. The slit diaphragms which are arranged in front of the photoelectric cells 38 to 44 are disposed in this plane, as well as the images formed by the lenses 30 to 36. In order to facilitate the following description of the mode of operation, these photoelectric cells are designated in FIGURE 4a by reference numerals 1 to 7 and in each instance are indicated by an upright rectangle which is representative of the active photo-surfaces bounded by the above-mentioned slit diaphragms.

As can be more clearly seen in FIGURE 4a, and as was mentioned above, these active photo-surfaces 1 to 7 are vertically offset. The staggering between two consecutive rows is equal to one-half the photo-cathode area width. Furthermore, the seven optical images produced by the lenses of scale division 20—the images 22 to 28—are shown in dashed lines. The position of all of these images corresponds to the central position of scale division 20. Thus, the photo-cathodes are so arranged that with no change of position of the original scale division, the optical image at any given instant of this scale division on two adjacent photoelectric cells is staggered.

Figures 5A, 5B:
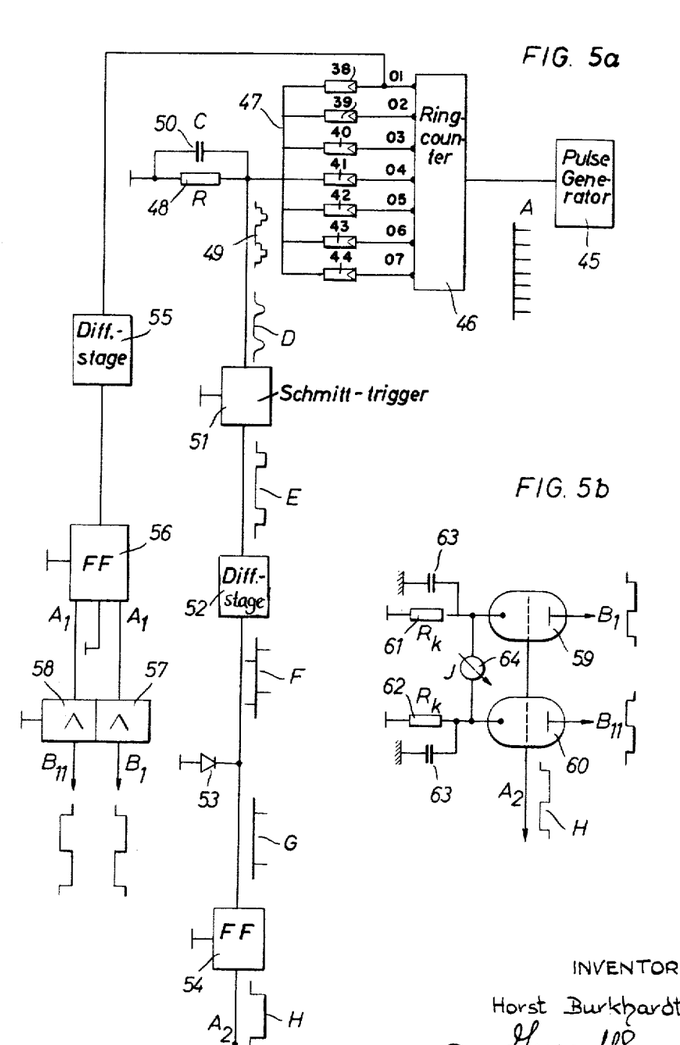
FIGURES 5a and 5b are schematic circuit diagrams of a circuit for electrically determining the position of an element, with the circuit of 5a being used to generate the position determining curve and the circuit of 5b being used to visually indicate this position.

As mentioned hereinabove, the photoelectric cell surfaces 1 to 7 will be successively interrogated by purely electrical means in order to determine the position of the scale division. This will be accomplished with the structure illustrated in FIGURE 5. In the circuit of FIGURE 5a, a timer or clock pulse source 45 is provided which supplies the pulses shown in FIG. 6, curve A. This curve is also illustrated at the output of the pulse source 45. A ring counter 46 having outputs O1 to O7, successively supplies pulses equal in duration to the interval of the pulses of curve A, and the output pulses of ring counter 46 proceed successively without interruption. The seven photoelectric cells 38 to 44 are connected with the seven outputs of ring counter 46. The currents of all photoelectric cells are additively mixed with each other through a common line 47 and are grounded through common resistor 48.

The mode of operation of this ring counter, including the additive mixing, will now be described with reference to FIGURE 4a. It will be assumed that the scale division 20 is in a central position and only photoelectric cells 40 to 42 receive light while cells 38 and 39 and 43 and 44 are dark, or unilluminated. When the pulses interrogate outputs O1 and O2 of the ring counter 46, no current flows in the resistor 48. On the other hand, when the photoelectric cell 40 is interrogated by the ring counter, a current flows which corresponds to one-half the maximum photoelectric cell current possible, because image 24 in row 3 of FIGURE 4a covers half the surface 3 of the photoelectric cell 40. When cell 41 is interrogated, the maximum current flows in resistor 48 because the image 25 completely overlaps the effective area of cell 41. When cell 42 is interrogated, again one-half the maximum possible current flows through resistor 48 due to the one-half overlap. Therefore, when the ring counter 46 has passed through a cycle, a current as illustrated in line 11 of FIGURE 4b will flow through resistor 48.

As has been mentioned above, the phase relationship of this current with respect to the pulses appearing at output O1 of the ring counter is functionally dependent upon the special position of the original scale position 20 at any given instant. If this scale division has been displaced with respect to its central position, the corresponding set of images 22 to 28 must also have been displaced relative to the position illustrated in FIGURE 4a. For example, as illustrated in FIGURE 4a, row 1, if the right and left edges of image 22 occupy the position indicated by the two vertical arrows, the current curve illustrated in FIGURE 4b, line 1, is generated in resistor 48 during interrogation by the ring counter 46. This current is the same in shape as the current of line 11 of FIGURE 4b; however, its phase is shifted with respect to the latter. The reference point for phase relationship or measurement is always the pulse appearing at the output O1 of ring counter 46 in FIGURE 5a.

Figure 4B:
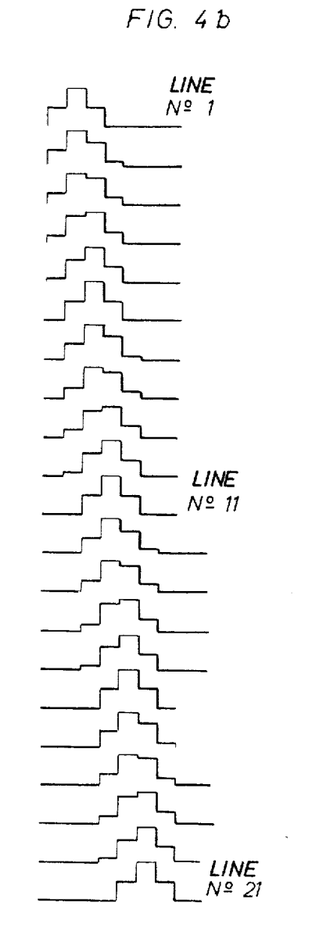

If the scale division 20 is displaced so that its optical images are displaced into a position between the positions illustrated by the vertical arrows of row 1 and the dotted lines of images 22 to 28, then the currents illustrated in FIGURE 4b, lines 2 through 10, will appear in resistor 48, depending upon the magnitude of the displacement. If a displacement of scale division 20 is such that the image moves from the central position illustrated in FIGURE 4a to the position where the vertical image edges coincide with the vertical arrows of row 7, then the current will have the curve or characteristic illustrated in lines 12 through 21 of FIGURE 4b.

Figure 6:
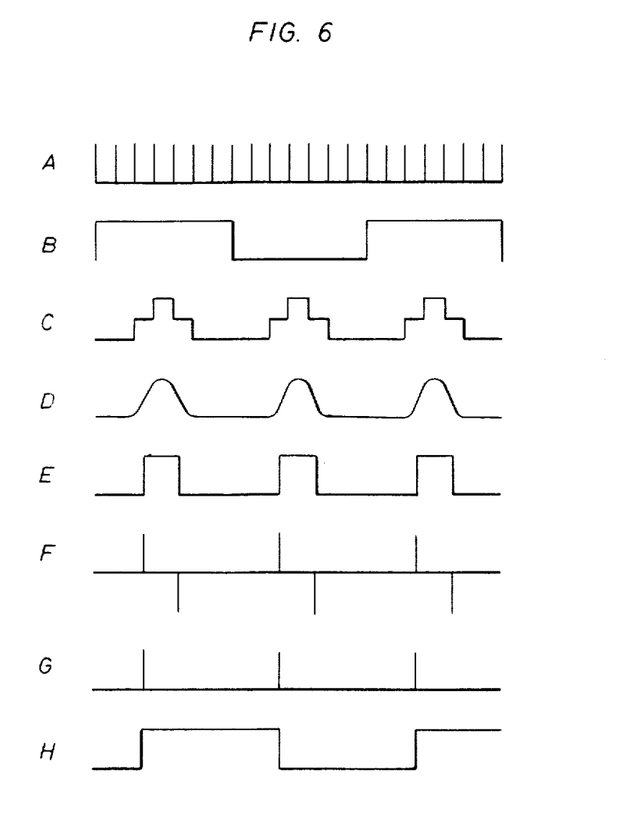
FIGURE 6 is a graphic view of various curves produced by the circuit illustrated in 5a, which curves are coordinated vertically.

The stepped or staircase type curve which appears at resistor 48 and which is the shape of one of the curves of FIGURE 4b, is indicated in FIGURE 5a by curve 49 and in FIGURE 6 by curve C. The curve is smoothed by capacitor 50 so that it then assumes the shape designated by curve D, FIGURE 6, which is converted into curve E of FIGURE 6 by a Schmitt trigger 51. A circuit stage 52 differentiates the voltage curve E and the output therefrom generates curve F. The negative pulses of curve F are short-circuited to ground by means of a rectifier 53, whereby curve G is obtained having only positive pulses. These pulses control a flip-flop 54 generating an output voltage H, which is a rectangular curve whose phase position with respect to the pulses at output O1 of the ring counter 46 corresponds to the position of scale division 20 at any given instant.

The output O1 of ring counter 46 is also connected to a differentiating stage 55 whose output controls a flip-flop 56. This latter flip-flop has rectangular output pulses or curves $B_1$ and $B_{11}$ which are in exactly opposite phases, and are formed through amplifiers 57 and 58.

A circuit is provided as shown in FIGURE 5b which renders visual observation of the position of scale division 20 possible. This is accomplished by providing the output voltages, which are in phase opposition, at the arrows of two tubes 59 and 60, the grids of which receive voltage H. Two resistors 61 and 62 are connected to the cathode inputs of these tubes and a capacitor 63 is connected in parallel with each resistor. Thus, when the images are in the position illustrated in FIGURE 4a, a measuring instrument 64 for giving a visual indication thereof, and which is connected between the cathodes of tubes 59 and 60, is disposed in a central position. It deflects to one or the other side when scale division 20 migrates or is displaced from its central position in one direction or the other. Thus, the exact position of scale division 20 at any given instant may be directly visually observed from instrument 64.

Figure 7:
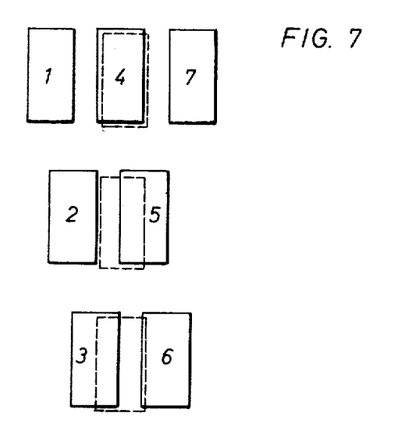
FIGURE 7 is a schematic view of a second embodiment of an optical scanning arrangement of the present invention.

FIGURE 7 illustrates a modification of the embodiment described in FIGURES 3 through 6. In this figure the plane of the drawing is at right angles to the optical axis of FIGURE 3 and is the plane in which the photoelectric cells are disposed. However, it is different from the embodiment of FIGURE 4a in that the photoelectric cells are not disposed singly in horizontal rows, but are disposed so that all seven are in three horizontal rows instead of seven. Therefore, instead of the seven lens elements 30 to 36 illustrated in FIGURE 3, only three lens elements are required.

In a manner similar to the illustration of FIGURE 4a, in FIGURE 7 the real images of the scale division 20 are illustrated in dotted lines when this scale division is in its central position. As illustrated in FIGURE 7 the stepped or staircase curve shown in line 11 of FIGURE 4b will be generated. If the images should be displaced to the left in FIGURE 7, then one or all of the curves according to lines 1 through 10 of FIGURE 4b will be generated, while if the images are displaced to the right in FIGURE 7, one of the curves illustrated in lines 12 through 21 will be generated. In order to determine the position of the scale division, the photoelectric cell surfaces 1 to 7 must also in this case be interrogated, and this may be accomplished, for example, by the circuit illustrated in FIGURE 5a. They are to be interrogated in numerical or ordinal sequence.

Figure 8:
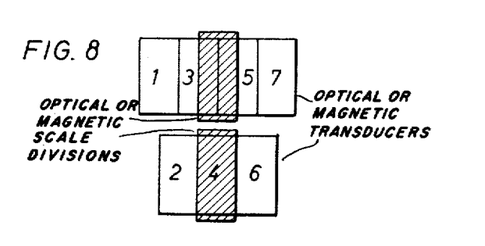
FIGURE 8 is a diagrammatic view of still another embodiment of the optical scanning section of the device.

Another modification of the arrangement of the photoelectric cells which may be provided, is illustrated in FIGURE 8. In this embodiment the cells are arranged in only two rows, and accordingly only two optical images and two lens elements need be provided. These two images are indicated by two rectangles which are cross-hatched and are superimposed upon the rectangles indicating the effective area of the photoelectric cells which are designated in numerical order. In this type of embodiment, the photoelectric cells must be very small and disposed closely to each other. They are preferably provided with radiation sensitive layers which may be applied by vaporization, such as lead sulphide layers, semiconductor layers having a blocking layer (photo diodes), etc.

Instead of the device illustrated in FIGURE 3 for generating seven images of scale division 20, or the three images required for the FIGURE 7 device, or the two images required for the FIGURE 8 device, many other optical arrangements may be used, such as, for example those similar to the devices which are used for color television cameras and which have semi-permeable mirrors in order to form three color component images.

It should be mentioned here that the interrogation of the photoelectric cells having surfaces 1 to 7 of FIGURES 4, 7, and 8 need not be in their numerical or ordinal sequence, but may be carried out in a sequence whereby they are first interrogated according to numerical order, then in inverse order, and again in numerical order, etc.

Figures 9, 10:
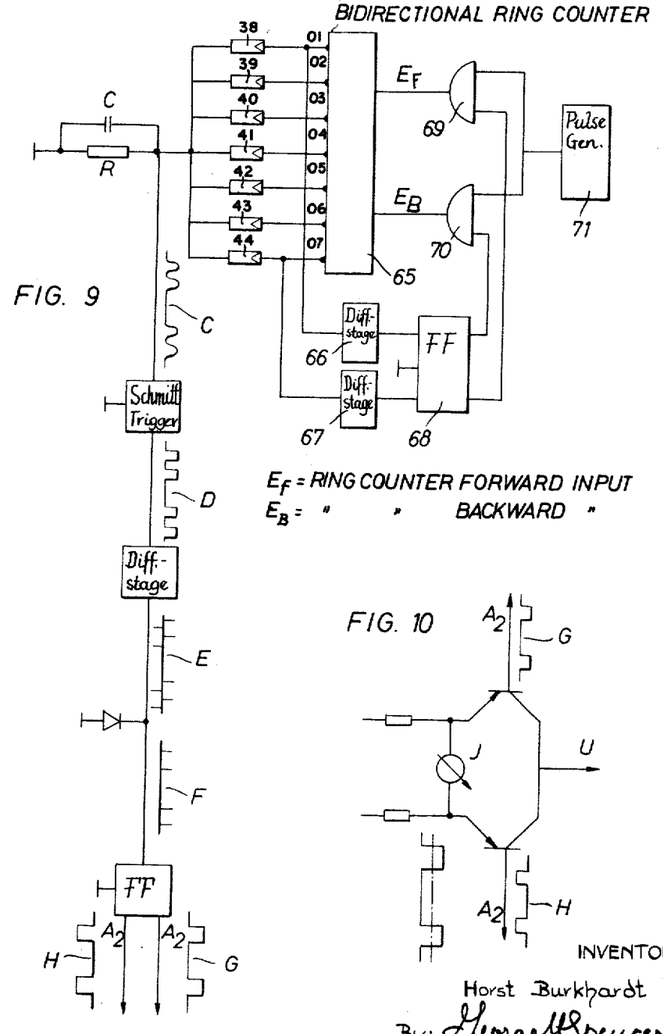
FIGURE 9 is a circuit diagram similar to FIGURE 5a, wherein the circuit is arranged for both forward and inverse interrogations with respect to the ordinal sequence of the photoelectric cells.
FIGURE 10 is a diagrammatic view of a device which is similar to the device illustrated in FIGURE 5b, which is for use with the circuit of FIGURE 9.

A circuit is illustrated in FIGURE 9 which may be used for carrying out this alternate numerical order of interrogation. This figure differs somewhat from the embodiment of FIGURE 5a in that a bi-directional ring counter 65 is used having two differentiating stages 66 and 67, a flip-flop 68, and two AND-stages 69 and 70. Assuming that this will be controlled by a clock pulse generating device 71, it will successively supply pulses to outputs O1 to O7 which are the width of the intervals of two pulses of the timer, and will then successively supply similar pulses to the outputs O6 to O1, and again supply similar pulses to outputs O2 to O7, etc.

Figure 11:
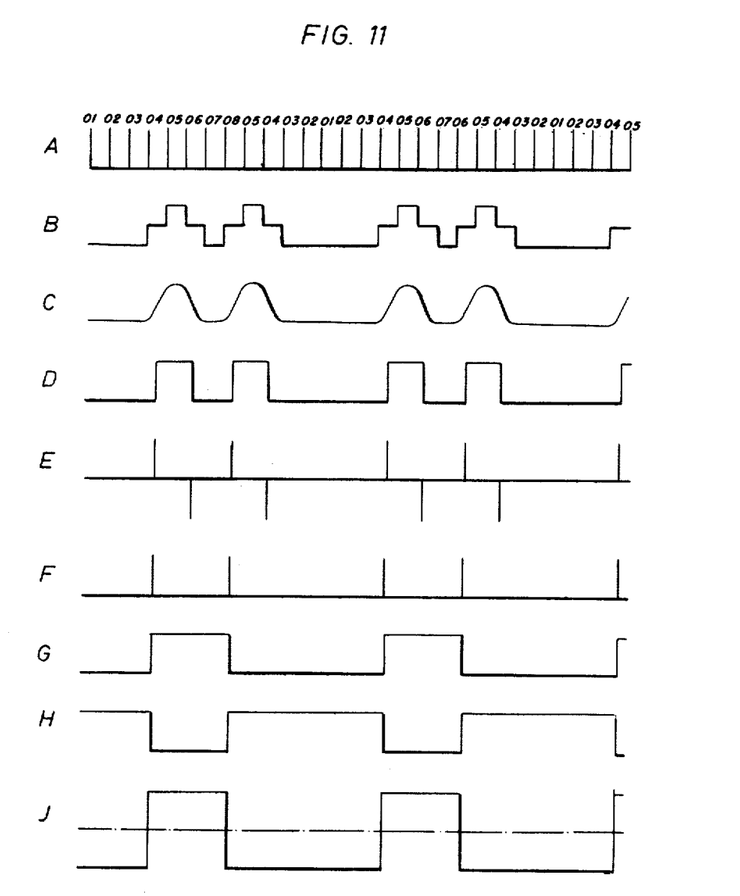
FIGURE 11 is a diagrammatic view of various curves which are generated by the circuit of FIGURE 9, which curves are vertically correlated.

Thus, the output pulses will appear in an oscillating manner in bi-directional counter 69 as indicated in curve A of FIGURE 11, where this is clarified by the use of the numbers of the outputs with which each clock pulse is associated. The photoelectric cells, the output resistor, the smoothing capacitor, the Schmitt trigger, the differentiating stage, the rectifier, and a flip-flop are also present in the circuit of FIGURE 9 in a similar manner to the circuit of FIGURE 5a. Therefore, due to the alternating progression of interrogation, the staircase curve B of FIGURE 11 will be formed at the upper terminal of the resistor common to all photoelectric cells, and after smoothing of the curve by the capacitor, the curve C will be formed. When passing through the Schmitt trigger the smooth curve of FIGURE 9 again is transformed into a rectangular curve D which appears as pulses of extremely short duration as shown in curve E after the differentiation process. Assuming that the negative pulses are suppressed by the rectifier, the sequence of pulses of curve F will be resultant.

These pulses control a flip-flop which supplies two output voltages G and H which are in phase opposition. Voltages G and H are disposed at the two base electrodes of the two transistors illustrated in FIGURE 10. The collector electrodes of these transistors are supplied with a direct voltage. The emitter electrodes are grounded, each through a separate resistor, and each is connected with the other by means of a measuring instrument, which may be similar to element 64 of FIGURE 5b. A rectangular pulse, curve J of FIGURE 11, may flow through this instrument and will thus again give an indication of the exact position of scale division 20 because the phase relationship or position of these rectangular pulses is, in this embodiment also, functionally dependent upon the voltage path of curve B or C.

Thus, while the phase measurement of the embodiments of FIGURES 5a and 5b is done by means of a reference curve which has a constant phase, the position of the smooth pulses illustrated in curve C of FIGURE 11 varies with the movement of scale division 20. This variation is such that with a displacement of scale division 20 in one direction, the first two pulses of curve C and the last two pulses of this curve approach one another. However, with a displacement of scale division 20 in the opposite direction they will move away from one another. Therefore, the measuring instrument of FIGURE 10 will again in this embodiment give an accurate measurement or visual indication of the position of scale division 20.

Such a device as that already described according to the present invention for the electro-optical determination of the position of the scale divisions may be used, for example, in the making of scales. This may be accomplished by providing a master scale which is fastened onto a movable table, together with a glass plate on which this scale to be manufactured will be fixed. The master scale is displaced along the device from scale division to scale division, each scale division being brought into the field of vision of the optical device so that its exact position within the field of vision may be determined by means of the photoelectric device. In this manner, the scale divisions may be extremely accurately arranged on the scale to be manufactured relying upon the phase indication obtained in the circuits according to FIGURE 5b or FIGURE 10. This may also be used for other purposes, for example, to solve the problem of producing a scale without errors, from a master scale which has known errors.

If desired, the currents flowing through the measuring instrument of FIGURES 5b and 10 may also be used to operate a control mechanism which guides the tool of a machine and brings it into a position determined by the position of the scale division at any given instant.

A magnetic analog may be indicated for the electro-optical device described hereinabove. In this case, the marking or indicia sequence would then consist of discrete scale divisions of a magnetizable material such as nickel which is applied by vaporization, or of regions or areas having different states of magnetization, in a continuous magnetizable layer.

Since this would require a disproportionately large expense to form images of a magnetic scale division by transferring the device of FIGURE 3 to a magnetically operating device, preferably several scale divisions of a single scale or of several parallel scales may be used.

Figure 8A:
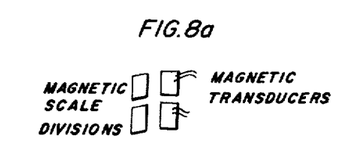
FIGURE 8a is a diagrammatic view of a magnetic arrangement.

The design and operation of a magnetic operating device will now be described in connection with FIGURE 8. The cross-hatched rectangles of FIGURE 8 are now considered to be representative of two separate magnetic scale divisions as shown in FIGURE 8a disposed one below the other and which may be portions of two parallel running separate magnetic scales. The rectangles 1 to 7 represent magnetic transducers which are suitable for static scanning of magnetized scale divisions; for example, they may be thin bismuth layers applied by vaporization and which change their resistance in a magnetic field, or Hall generators of a known design. The remainder of the device may correspond to the electro-optical device which was described above in connection with FIGURE 5. The devices which were described in connection with FIGURES 4a and 7 may also be readily modified for use with the magnetically operating device.

It should be noted that a single image of a correspondingly large scale division may take the place of the several images in the electro-optically operating device of FIGURES 3, 4a, 7, or 8. However, if this long scale division does not run perfectly linear, which is relatively difficult to achieve in actual practice, undesired measurement errors will occur, which may be avoided in the above-described device operating with optical image division.

It will be understood that the above description of the present invention is susceptible to various modifications, changes, and adaptations, and the same are intended to be comprehended within the meaning and range of equivalents of the appended claims.

What is claimed is:
1. A device for electrically determining the position of a structural element provided with a scale, comprising, in combination:
 (a) a movable structural element provided with a scale composed of markings and which moves through a measuring range;
 (b) means for indicating at a plurality of stations the presence of a marking of said scale within said measuring range; and
 (c) electrical position determining means including
  (1) at least three transducer heads at said stations sensitive to the indication of said marking for continuously scanning said scale, said heads being arranged to produce a maximum output when the marking is in a predetermined central position and also when it is displaced by a predetermined distance from said position or by an integer multiple of said predetermined distance, at least three of said transducer heads, at any marking displacement within the measuring range between the integer multiples of said distance, sensing the position of such marking and generating output signals of appreciable magnitude,
  (2) stages of periodically interrogating and adding the output signals of said transducer heads for a definite and at least approximately constant time interval in the same order in each period for generating an alternating summation signal, and
  (3) a comparative section receiving the summation signal which is dependent upon the head scanning and interrogation, and receiving a signal significant of the initiation of the interrogation period and, by comparative phase measurement, giving an indication of the position of said marking.

2. A device as defined in claim 1, wherein at least two transducer heads are coordinated with each scale marking.

3. A device as defined in claim 2, wherein the sensing surfaces of said transducer heads are discrete closely adjacent elements, applied by vaporization in a vacuum.

4. A device as defined in claim 1, wherein said marking indicating means includes a focusing lens composed of lens elements equal in number to the transducer heads, said lens elements being aligned in a plane and each focusing a separate image of said marking at a station.

5. A device as defined in claim 1, wherein said transducer heads are aligned in a plane and each is offset from the other vertically a distance equal to one-half the width of the sensing surface of a transducer head and also offset horizontally.

6. A device as defined in claim 1, wherein said transducer heads are aligned in a plane with a plurality of said heads disposed in each horizontal row, the heads in a row are spaced apart a distance equal to one-half the width of the sensing surface of a head, and the heads in one row are offset vertically from the heads in another row a distance equal to one-half the width of the sensing surface of a head.

7. A device as defined in claim 1, wherein said transducer heads are aligned in a plane with a plurality of said heads disposed in each horizontal row, the heads in a row being closely adjacent each other, and the heads in one row are offset vertically from the heads in another row a distance equal to one-half the width of the sensing surface of a head.

8. A device for electrically determining the position of a structural element provided with a scale, comprising, in combination:

(a) a movable structural element provided with a scale composed of at least one marking and which moves through a measuring range;

(b) means for projecting a plurality of separate optical images of said marking of said scale to a plurality of stations spaced from said scale; and (c) electrical position determining means including
(1) at least three photosensitive means at said stations sensitive to the projection of said plurality of separate images for continuously scanning said scale, said photosensitive means being arranged to produce a maximum output when said marking is in a predetermined central position and also when it is displaced by a predetermined distance from said position or by an integer multiple of said predetermined distance, at least three of said photosensitive means, at any marking displacement within the measuring range between the integer multiples of said distance, sensing the position of such marking and generating output signals of appreciable magnitude, and the optical image of a scale marking at any given instant being staggered between two photosensitive means which are numerically adjacent,
(2) stages for periodically interrogating and adding the output signals of said photosensitive means for a definite and at least approximately constant time interval successively and in numerical order for generating an alternating summation signal,
(3) means receiving the summation signal from said stages for smoothing the curve shape, and
(4) a comparative section receiving the smoothed summation signal which is dependent upon the scanning and interrogation, and receiving a signal significant of the initiation of the interrogation period and, by comparative phase measurement, giving an indication of the position of said marking.

9. A device as defined in claim 8, wherein said interrogation and adding stages are arranged to also interrogate said photosensitive means in inverse numerical order.

10. A device as defined in claim 8, wherein said photosensitive means are arranged so that an odd number thereof simultaneously sense the marking in its central position.

11. A device as defined in claim 8, comprising a slit diaphragm disposed in front of the photosensitive means to mask them, said slits being of the same width as said images.

12. A device as defined in claim 8, wherein said photosensitive means are arranged so that the distance between any two of them which are numerically adjacent is the same.

13. A device as defined in claim 8, wherein said photosensitive means are photoelectric cells.

14. A device for electrically determining the position of a structural element provided with a scale, comprising, in combination:

(a) a movable structural element provided with a scale composed of at least two magnetic markings and which moves through a measuring range; and (b) electrical position determining means including
(1) at least three transducer heads spaced from said scale and sensitive to the magnetic markings for continuously and statically scanning said scale, said heads being arranged to produce a maximum output when the markings are in a predetermined central position and also when they are displaced by a predetermined distance from said position or by an integer multiple of said predetermined distance, at least three of said transducer heads, at any marking displacement within the measuring range between the integer multiples of said distance, sensing the position of such markings and generating output signals of appreciable magnitude,
(2) stages for periodically interrogating and adding the output signals of said transducer heads for a definite and at least approximately constant time interval in the same order in each period for generating an alternating summation signal,
(3) means receiving the summation signal from said stages for smoothing the curve shape, and
(4) a comparative section receiving the smoothed summation signal which is dependent upon the head scanning and interrogation, and receiving a signal significant of the initiation of the interrogation period and, by comparative phase measurement, giving an indication of the position of said markings.

15. A device as defined in claim 14, wherein said heads are coordinated with at least two scale divisions disposed one after the other in a single scale.

16. A device as defined in claim 14, wherein each scale division which is to have its position determined is composed of at least two markings.

17. A device as defined in claim 16, wherein said two markings are disposed on two identical and parallel scales disposed on the same carrier.

18. A device for electrically determining the position of a structural element provided with a scale, comprising, in combination:

(a) a movable structural element provided with a scale composed of markings and which moves through a measuring range;

(b) means for indicating at a plurality of stations the presence of a marking of said scale within said measuring range; and (c) electrical position determining means including
(1) at least three transducer heads at said stations sensitive to the indication of said marking for continuously scanning said scale, said heads being arranged to produce a maximum output when the marking is in a predetermined central position and also when it is displaced by a predetermined distance from said position or by an integer multiple of said predetermined distance, at least three of said transducer heads, at any marking displacement within the measuring range between the integer multiples of said distance, sensing the position of such marking and generating output signals of appreciable magnitude, (2) stages for periodically interrogating and adding the output signals of said transducer heads for a definite and at least approximately constant time interval in the same order in each period for generating an alternating summation signal, (3) means receiving the summation signal from said stages for smoothing the curve shape, (4) a wave shaping section receiving said smoothed curve for generating in accordance therewith a rectilinear curve significant of the summation signal and having only two amplitude values, and (5) a comparative section receiving said rectilinear curve which is dependent upon the head scanning and interrogation, and receiving a signal significant of the initiation of the interrogation process and, by comparative phase measurement, giving an indication of the position of said marking.

References Cited in the file of this patent

UNITED STATES PATENTS

| | | |
|---|---|---|
| 2,875,524 | Bower et al. | Mar. 3, 1959 |
| 2,880,512 | Fenemore et al. | Apr. 7, 1959 |
| 2,916,826 | Bower et al. | Dec. 15, 1959 |
| 3,036,219 | Thompson | May 22, 1962 |

UNITED STATES PATENT OFFICE
CERTIFICATE OF CORRECTION

Patent No. 3,096,441  July 2, 1963

Horst Burkhardt

It is hereby certified that error appears in the above numbered patent requiring correction and that the said Letters Patent should read as corrected below.

Column 8, line 62, for "stages of" read -- stages for --.

Signed and sealed this 31st day of December 1963.

(SEAL)
Attest:
ERNEST W. SWIDER

Attesting Officer

EDWIN L. REYNOLDS

Acting Commissioner of Patents